(12) United States Patent
Balensiefer et al.

(10) Patent No.: US 7,316,451 B2
(45) Date of Patent: Jan. 8, 2008

(54) WEARABLE SIDE IMPACT PROTECTOR

(75) Inventors: Eugene R. Balensiefer, Seymour, IN (US); Bruce Cazenave, Columbus, IN (US); Kelley L. Clayburn, Elizabethtown, IN (US)

(73) Assignee: Cosco Management, Inc., Wilmington, DE (US)

( * ) Notice: Subject to any disclaimer, the term of this patent is extended or adjusted under 35 U.S.C. 154(b) by 216 days.

(21) Appl. No.: 11/140,242

(22) Filed: May 27, 2005

(65) Prior Publication Data

US 2005/0268381 A1 Dec. 8, 2005

Related U.S. Application Data

(60) Provisional application No. 60/575,955, filed on Jun. 1, 2004.

(51) Int. Cl.
*B60N 2/42* (2006.01)
(52) U.S. Cl. .............. 297/216.12; 297/216.11; 297/464
(58) Field of Classification Search .......... 297/393, 297/465, 216.11, 216.12, 464, 250.1; 128/869, 128/97.1; 2/415, 414, 410
See application file for complete search history.

(56) References Cited

U.S. PATENT DOCUMENTS

| | | | | | |
|---|---|---|---|---|---|
| 15,581 | A | * | 8/1856 | Slaughter | 297/393 |
| 382,949 | A | * | 5/1888 | Campbell | 297/393 |
| 2,492,383 | A | * | 12/1949 | Jones | 297/402 |
| 2,796,866 | A | * | 6/1957 | Cohen | 128/869 |
| 2,973,030 | A | * | 2/1961 | Matthewson | 297/393 |
| 4,400,820 | A | * | 8/1983 | O'Dell et al. | 378/209 |
| 4,589,407 | A | * | 5/1986 | Koledin et al. | 128/869 |
| 4,607,885 | A | * | 8/1986 | del Fierro | 297/397 |
| 4,707,031 | A | * | 11/1987 | Meistrell | 297/393 |
| 5,076,264 | A | * | 12/1991 | Lonardo et al. | 602/19 |
| 5,505,523 | A | * | 4/1996 | Wang | 297/393 |
| 5,695,245 | A | * | 12/1997 | Carlson et al. | 297/314 |
| 5,765,893 | A | * | 6/1998 | Ziegler | 297/256.15 |
| 6,386,639 | B1 | * | 5/2002 | McMichael | 297/464 |
| 7,004,545 | B2 | * | 2/2006 | Miller | 297/393 |

* cited by examiner

*Primary Examiner*—Milton Nelson, Jr.
(74) *Attorney, Agent, or Firm*—Barnes & Thornburg LLP

(57) ABSTRACT

A side impact protector is configured to be worn by a youth seated in a child-restraint system anchored in place on a vehicle seat. Such a protector may also be worn by a person of any age seated in a vehicle and restrained using a seat belt harness of the type found onboard a vehicle.

13 Claims, 4 Drawing Sheets

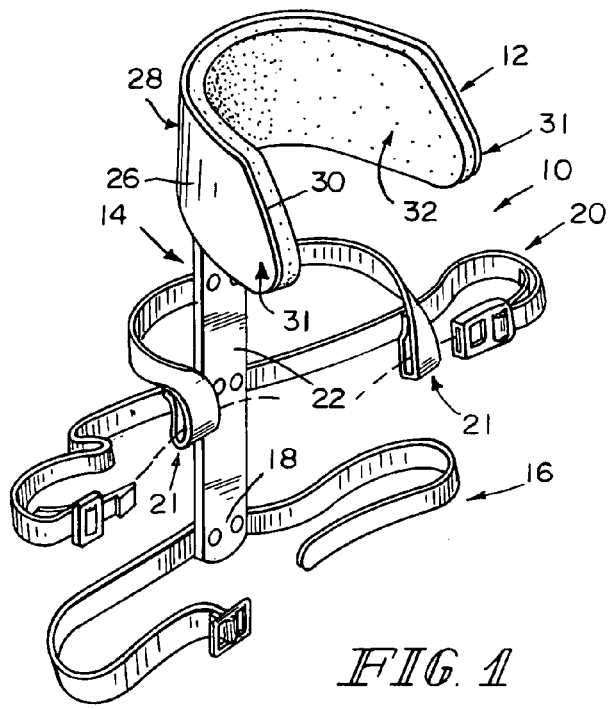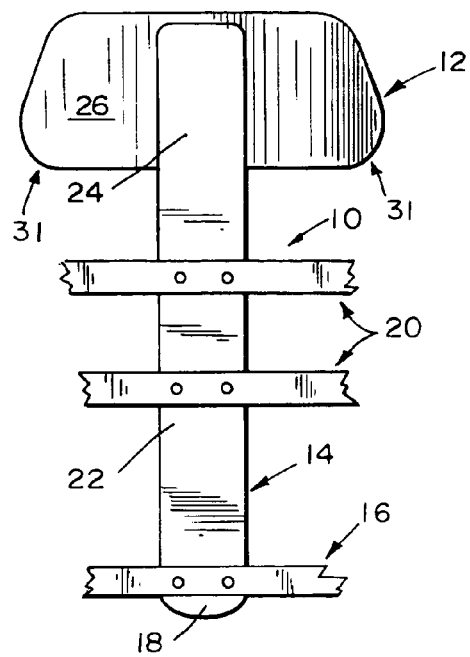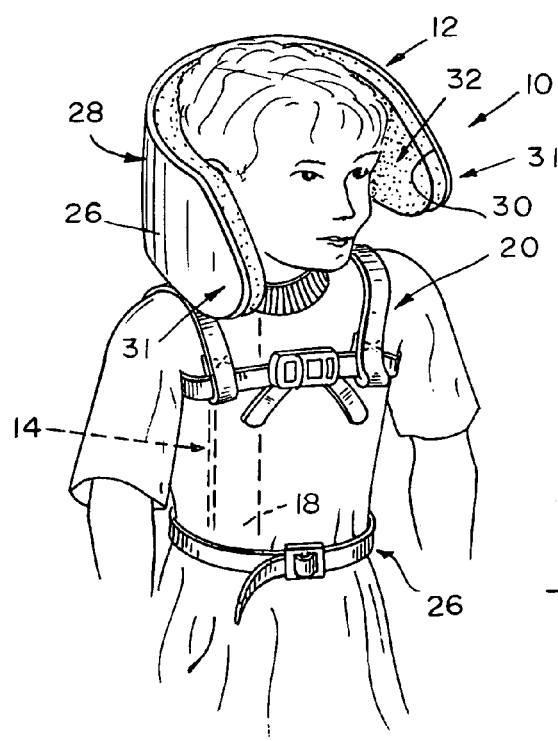

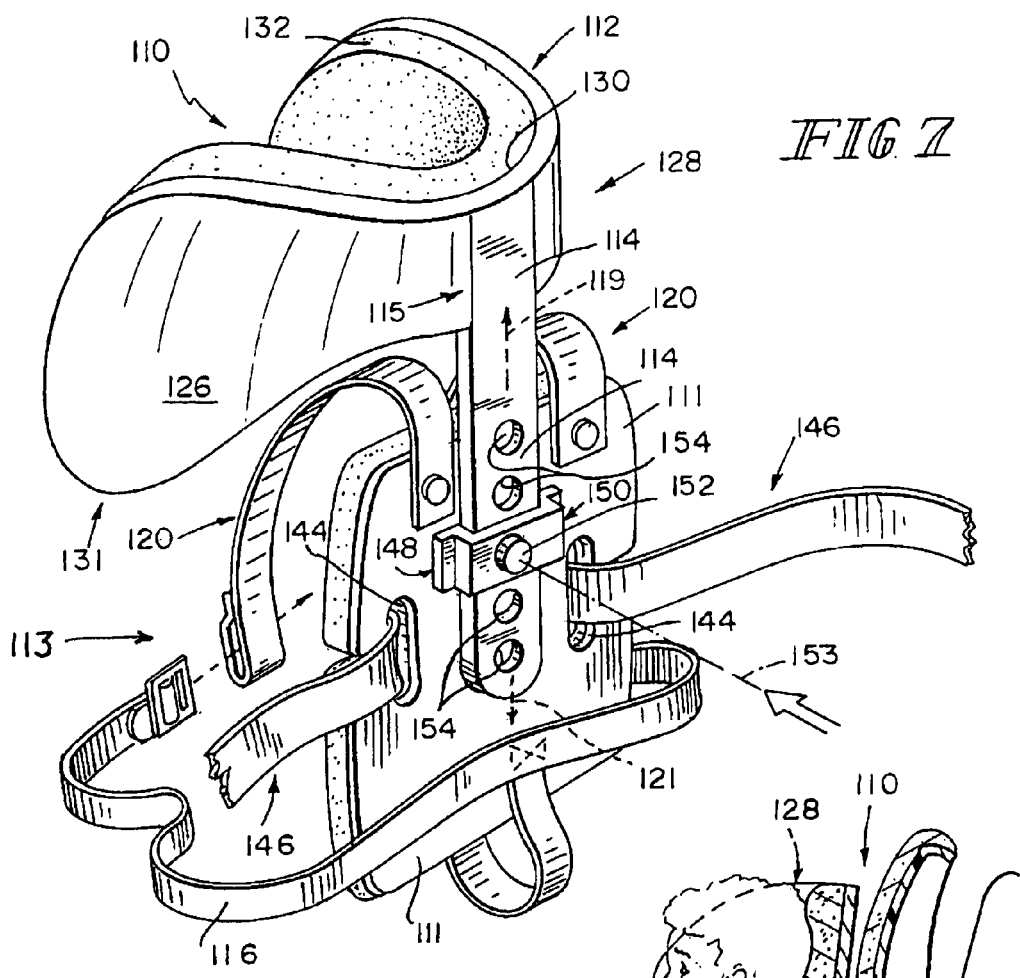
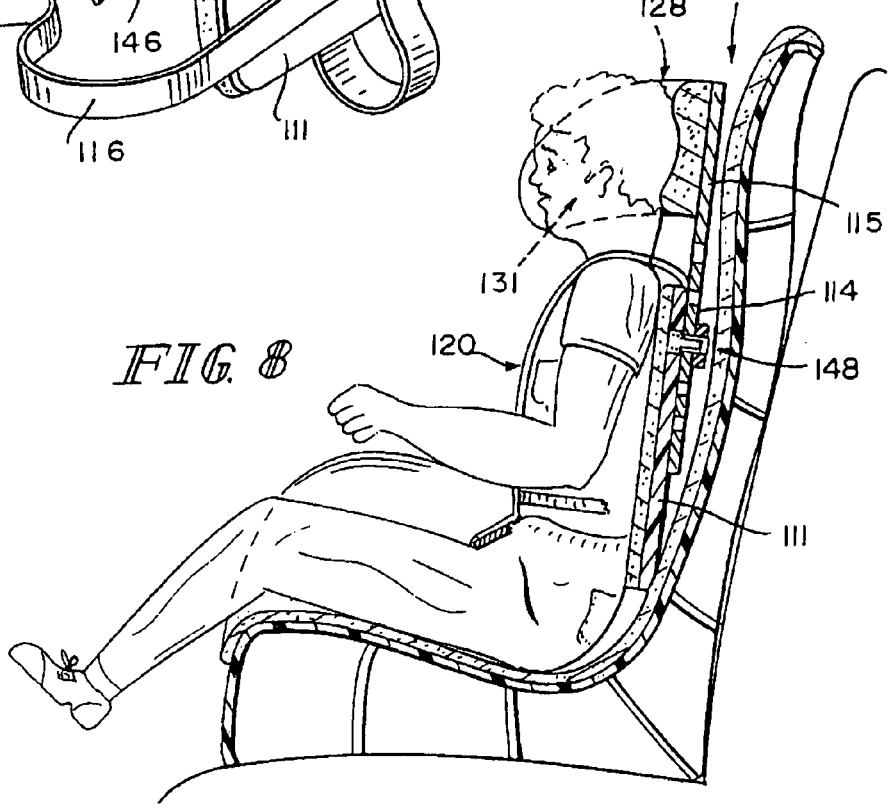

WEARABLE SIDE IMPACT PROTECTOR

This present application claims benefit of U.S. Provisional Patent Application Ser. No. 60/575,955, filed Jun. 1, 2004, which application is hereby incorporated by reference herein.

BACKGROUND

The present disclosure relates to body cushioning systems for use in vehicles, and in particular side impact protectors for use by people traveling in vehicles. More particularly, the present disclosure relates to a side impact protector that is wearable by a child traveling in a vehicle.

Juvenile seats are widely used to transport young children in automobiles and other vehicles. Such seats include backless and high back booster seats.

SUMMARY

According to the present disclosure, a side impact protector is configured to be worn by a youth seated in a child-restraint system anchored in place on a vehicle seat. Such a protector may also be worn by a person of any age seated in a vehicle and restrained using a seat belt harness of the type found onboard a vehicle.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a wearable side impact protector in accordance with a first embodiment of the present disclosure;

FIG. 2 is a rear elevation view of the protector of FIG. 1 with portions broken away;

FIG. 3 is a perspective view of a child wearing the side impact protector shown in FIGS. 1 and 2;

FIG. 7 is a perspective view of a wearable side impact protector in accordance with a second embodiment of the present disclosure; and FIG. 8 is a side elevation view, with portions broken away, of a child seated in a high back booster seat while wearing the side impact protector of FIG. 7.

DETAILED DESCRIPTION

Figure 4:
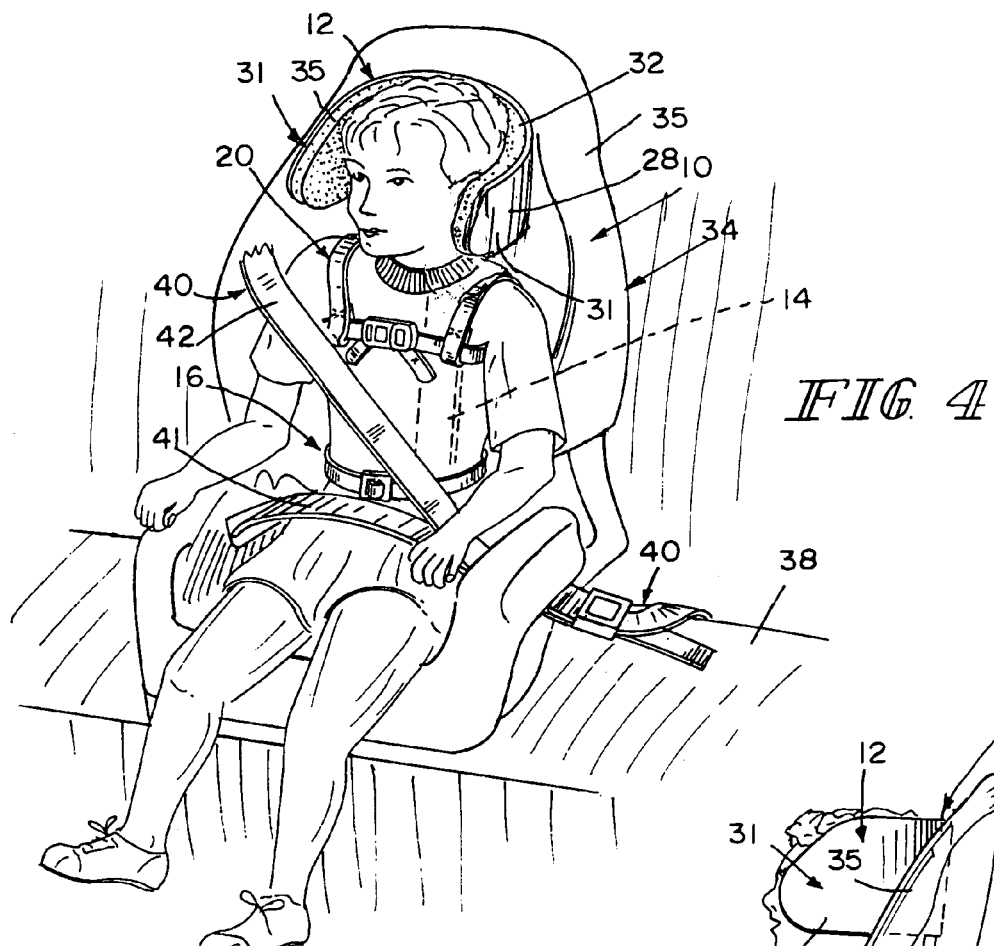
FIG. 4 is a perspective view of the child of FIG. 3 seated in a high back booster seat located in a vehicle equipped with a seat-belt restraint system while wearing the side impact protector of FIGS. 1-3.

Side impact protector 10 includes a head cradle 12, cradle support 14 coupled to head cradle 12, a waist strap 16 coupled to a lower portion 18 of cradle support 14, and a shoulder harness 20 coupled to a middle portion 22 of cradle support 14 as shown, for example, in FIGS. 1 and 2. Cradle support 14 also includes an upper portion 24 coupled to a rear surface 26 of head cradle 12 as shown best in FIG. 2. Head cradle 12 and cradle support 14 cooperate to form a brace that is adapted to transmit, direct, resist, or support weight or pressure of the head and/or neck of a person wearing side impact protector 10.

Illustratively, shoulder harness 20 is configured as a first strap and a second strap adapted to be coupled to a wearer, and waist strap 16 is configured as a third strap adapted to be coupled to the wearer. First strap 20 is formed to include loops 21 at end portions of first strap 20. Loops 21 are configured to receive a portion of second strap 20 therethrough.

Head cradle 12 includes a U-shaped frame 28 formed to include a convex portion providing rear surface 26 and a concave portion 30 facing toward the head of a person wearing side impact protector 10 as shown in FIG. 3. Head cradle 12 also includes a U-shaped cushion 32 mounted on concave portion 30 to provide padding for the head and neck of the person wearing side impact protector 10. Head cradle 12 includes side wings 31 to envelope the head of a wearer; however, head cradle 12 is open on the top and front. Illustratively, side wings 31 include a first side wing and a second side wing. A width of head cradle 12 extends from the first side wing 31 to the second side wing 31 and a width of cradle support 14 is less than the width of head cradle 12.

Waist strap 16 and shoulder harness 20 are used to retain cradle support 14 in place along the back of a wearer as suggested in FIG. 3. It is within the scope of this disclosure to use a backpack (not shown) in place of waist strap 16 and shoulder harness 20 to retain cradle support 14 in place on a wearer.

Figure 5:
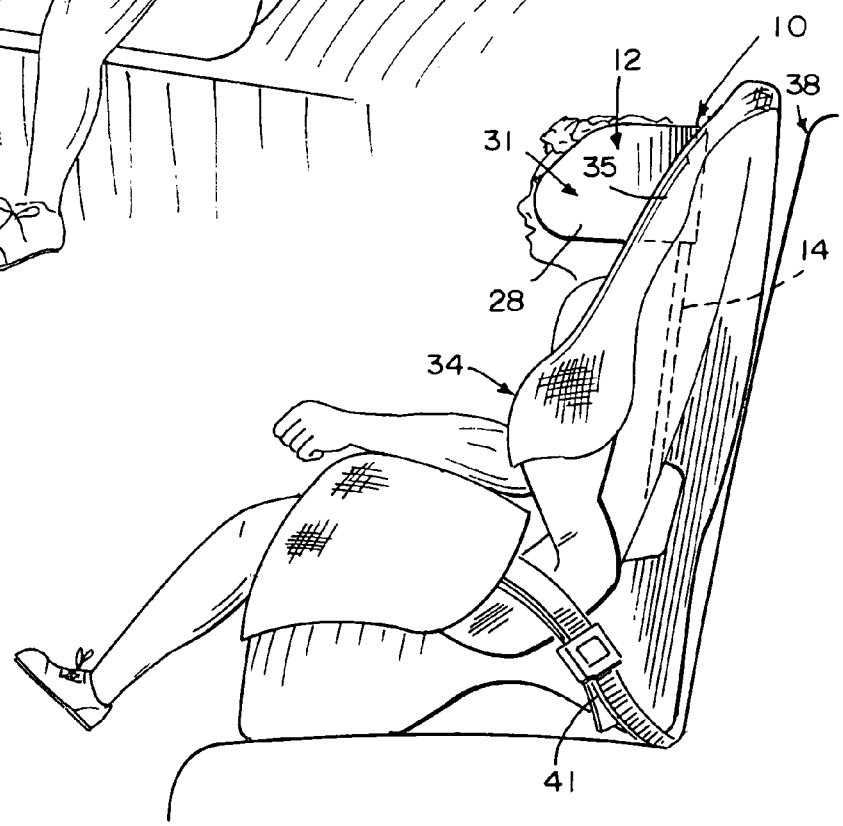
FIG. 5 is a side elevation view of the high back booster seat of FIG. 4.
Figure 6:
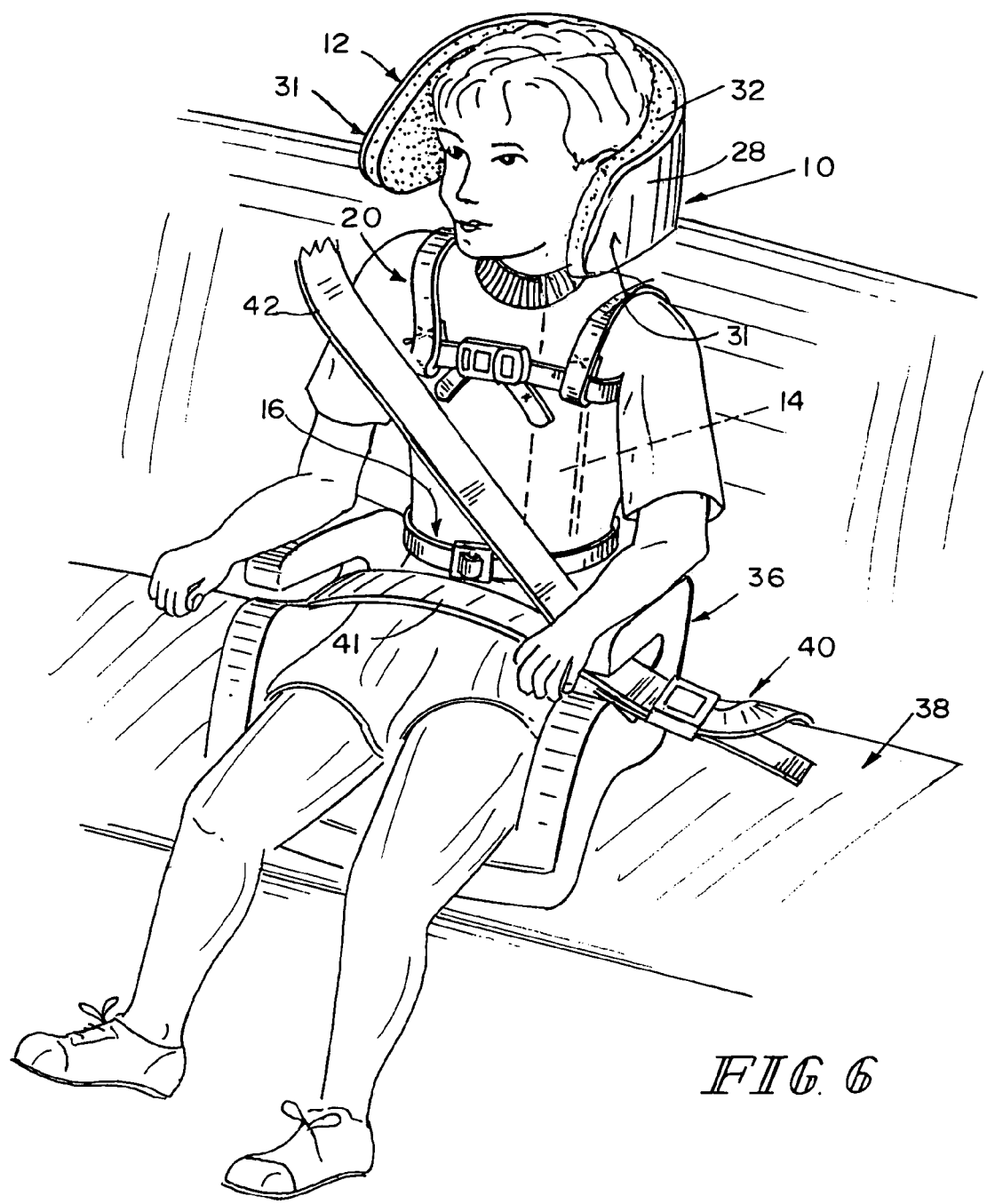
FIG. 6 is a perspective view of the child of FIG. 3 seated in a backless booster seat located in a vehicle equipped with a seat-belt restraint system while wearing the side impact protector of FIGS. 1-3.

Cradle support 14 is sized and shaped to cause head cradle 12 to surround a portion of a wearer's head and neck before and after the wearer is seated in a high back juvenile seat 34 or a backless juvenile seat 36 as suggested, for example, in FIGS. 3-6. Although not shown, a wearer could sit directly on a vehicle seat 38 and be restrained by a vehicle seat-belt harness 40 while wearing side impact protector 10 without necessarily sitting on a juvenile seat 34 or 36. Seat-belt harness 40 includes a lap belt 41 and a shoulder belt 42.

Side impact protector 10 can be used with a car seat having an internal harness system or with a belt-positioning booster seat. Protector 10 can be attached to a wearer via a back pack system or a harness system. Protector 10 can be made of both hard and soft goods such as polyester, nylon, cotton, and polypropylene. As suggested in FIG. 5, in the case of a high back juvenile seat 34, a portion of head cradle 12 is located in a space provided between a left side wing 35 and a right side wing 35 of seat 34 when the wearer of side impact protector 10 is seated on seat 34.

Side impact protector 110 is shown in FIG. 7. Protector 110 includes a harness mount plate 111 configured to lie along the back of a wearer and carry, for example, a five-point harness 113 including, for example, a waist strap 116 and a shoulder harness 120. Protector 110 also includes a brace 115 coupled to harness mount plate 111 and adapted to transmit, direct, resist, or support weight or pressure of the head and/or neck of a person wearing side impact protector 110.

In the illustrated embodiment, harness mount plate 111 is formed to include a spaced-apart pair of slots 144 sized to receive a portion of an automobile belt 146 therein. Automobile belt 146 can thus be used to anchor harness mount plate 111 in a desired position relative to a vehicle seat (i.e., seat 38) on which a wearer of protector 110 is seated.

Also in the illustrated embodiment, brace 115 includes a head cradle 112 and a cradle support 114 coupled to head cradle 112. Head cradle 112 includes a U-shaped frame 128 formed to include a convex portion providing a rear surface 126 and a concave portion 130 facing toward the head of a person wearing side impact protector 110. Head cradle 112 also includes a U-shaped cushion 132 mounted on concave portion 130 to provide padding for the head and neck of the person wearing side impact protector 110. Head cradle 112 includes side wings 131 to envelope the head of a wearer; however, head cradle 112 is open on the top and front.

Cradle support 114 is formed monolithically with U-shaped frame 128 in the illustrated embodiment. Cradle support 114 extends downwardly from U-shaped frame 128 to mate with harness mount plate 111. In the illustrated embodiment, an adjustable head cradle height-adjustment mechanism 148 provides means for mounting cradle support 114 for movement relative to harness mount plate 111 between among several predetermined positions along the length of cradle support 114 so that a user may vary the height of head cradle 112 relative to harness mount plate 111 worn by the wearer of protector 110.

In the illustrated embodiment, height-adjustment mechanism 148 includes a support guide 150 coupled to harness mount plate 111 and formed to include a channel sized to receive cradle support 114 and allow up-and-down movement in directions 119 and 121 of cradle support 114 therein. Height-adjustment mechanism 148 further includes a retainer 152 mounted for movement on support guide 150 in direction 153 to engage and disengage retainer receivers 154 formed in vertically spaced-apart relation one to another along the length of cradle support 114 as suggested, for example, in FIG. 7.

With respect to side impact protector 10, U-shaped frame 28, concave portion 30, U-shaped cushion 32, and first side wing 31 and second side wing 31 associated with the head cradle 12 provide means for enveloping the head of the wearer. First strap 20, second strap 20, and third strap 16 also cooperate to form harness means to inhibit movement of the head and a neck of the wearer in response to sudden lateral forces being applied to a torso of the wearer.

What invention claimed is:

1. A side impact protector for bracing a head and neck of a wearer, the side impact protector comprising a harness mount plate configured to lie along a back of a wearer including a shoulder harness having a first strap, a second strap, a third strap positioned to lie lower than the first and second straps, and a head cradle height-adjustment mechanism configured to receive a portion of a head cradle, a brace coupled to the head cradle height-adjustment mechanism and configured to provide means for inhibiting movement of the head and neck of a wearer in response to sudden lateral forces being applied to a torso of the wearer, and including a head cradle including a U-shaped frame formed to include a convex portion providing a rear surface and a concave portion arranged to face toward the head of a wearer and a cradle support coupled to the head cradle and mounted for up-and-down movement of the head cradle between a lowest position located a first distance from the harness mount plate and a highest position located a greater second distance from the harness mount plate.

2. The side impact protector of claim 1, wherein the harness mount plate is formed to include a spaced-apart pair of slots sized to receive a portion of an automobile belt therein.

3. The side impact protector of claim 2, further comprising anchor means for anchoring the harness mount plate in a desired position relative to a vehicle seat so that a wearer is restrained relative to the vehicle seat.

4. The side impact protector of claim 1, wherein the head cradle includes a U-shaped cushion mounted on the concave portion of the head cradle.

5. The side impact protector of claim 4, wherein the head cradle further includes side wings configured to envelope the head of the wearer.

6. The side impact protector of claim 5, wherein the cradle support and U-shaped frame are monolithic.

7. The side impact protector of claim 1, wherein the head cradle height-adjustment mechanism is configured to mount the cradle support for slidable movement relative to the harness mount plate between among several predetermined positions along the length of the cradle support.

8. The side impact protector of claim 7, wherein the head cradle height-adjustment mechanism includes a support guide, a retainer coupled to the support guide, and retainer receivers formed in vertically spaced-apart relation to one another along the length of the cradle support.

9. The side impact protector of claim 8, wherein the support guide is formed to include a channel sized to receive the cradle support.

10. The side impact protector of claim 8, wherein the support guide is configured to allow up-and-down movement of the cradle support therein.

11. The side impact protector of claim 8, wherein the retainer receivers are associated with several predetermined positions along a length of the cradle support.

12. The side impact protector of claim 8, wherein the retainer is configured to engage and disengage the retainer receivers.

13. The side impact protector of claim 1, in combination with a juvenile vehicle seat, wherein the side impact protector is adapted to be coupled to a wearer, the wearer of the wearable side impact protector is received by the juvenile vehicle seat, and the wearable side impact protector is positioned to lie between the wearer and the juvenile vehicle seat.

* * * * *